United States Patent [19]
Walker

[11] Patent Number: 6,149,040
[45] Date of Patent: Nov. 21, 2000

[54] REMOVABLE VEHICLE TRUNK ORGANIZER

[76] Inventor: Viola Walker, P.O. Box 209053, Chicago, Ill. 60620-9053

[21] Appl. No.: 09/257,411

[22] Filed: Feb. 25, 1999

[51] Int. Cl.[7] ....................................................... B60R 7/02
[52] U.S. Cl. ....................... 224/539; 224/47.32; 224/404; 296/37.1; 410/145
[58] Field of Search ..................................... 224/539, 542, 224/404, 925, 551, 42.32, 42.33, 42.34; 296/37.6, 37.8, 37.1; 410/143, 151, 145, 149

[56] References Cited

U.S. PATENT DOCUMENTS

| 4,189,056 | 2/1980 | Majewski . | |
| 4,944,544 | 7/1990 | Dick | 224/542 |
| 4,946,215 | 8/1990 | Taylor | 296/37.6 |
| 5,368,210 | 11/1994 | Wotring . | |
| 5,535,931 | 7/1996 | Barlow et al. . | |
| 5,713,502 | 2/1998 | Dixon . | |

Primary Examiner—Stephen P. Garbe
Attorney, Agent, or Firm—Michael R. McKenna

[57] ABSTRACT

A removable vehicle trunk organizer comprising a container with a variable number of separated compartments and a reversible locking device for laterally securing the container within a vehicle trunk. The reversible locking device comprises a spiral throw-out lock with at least one extensible leg linked to an exterior actuator.

7 Claims, 2 Drawing Sheets

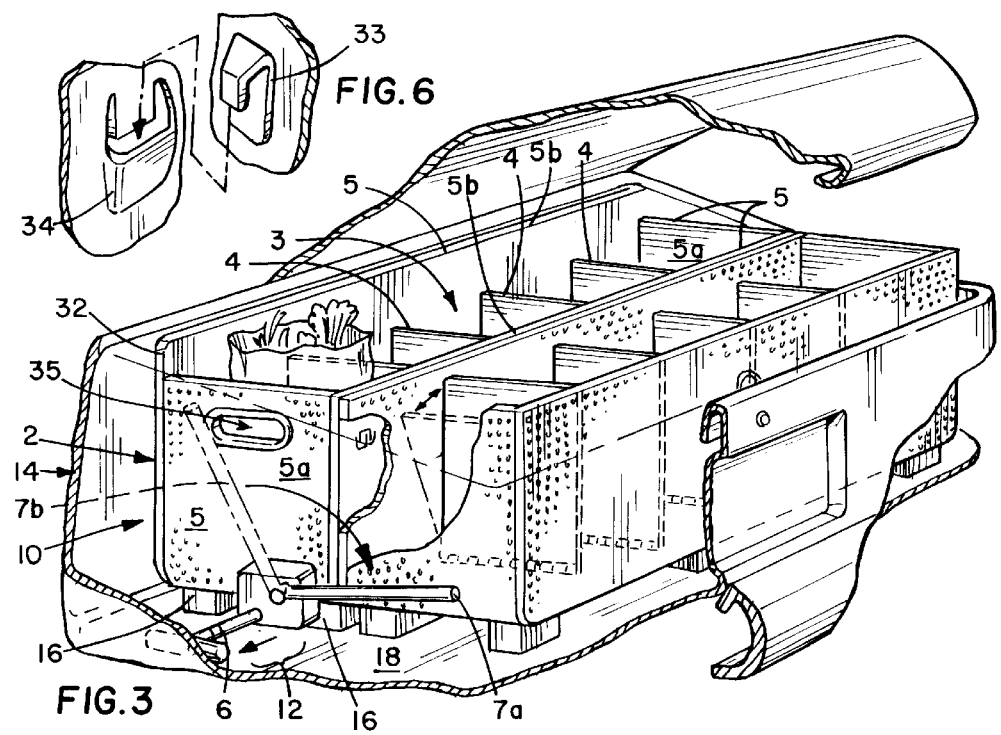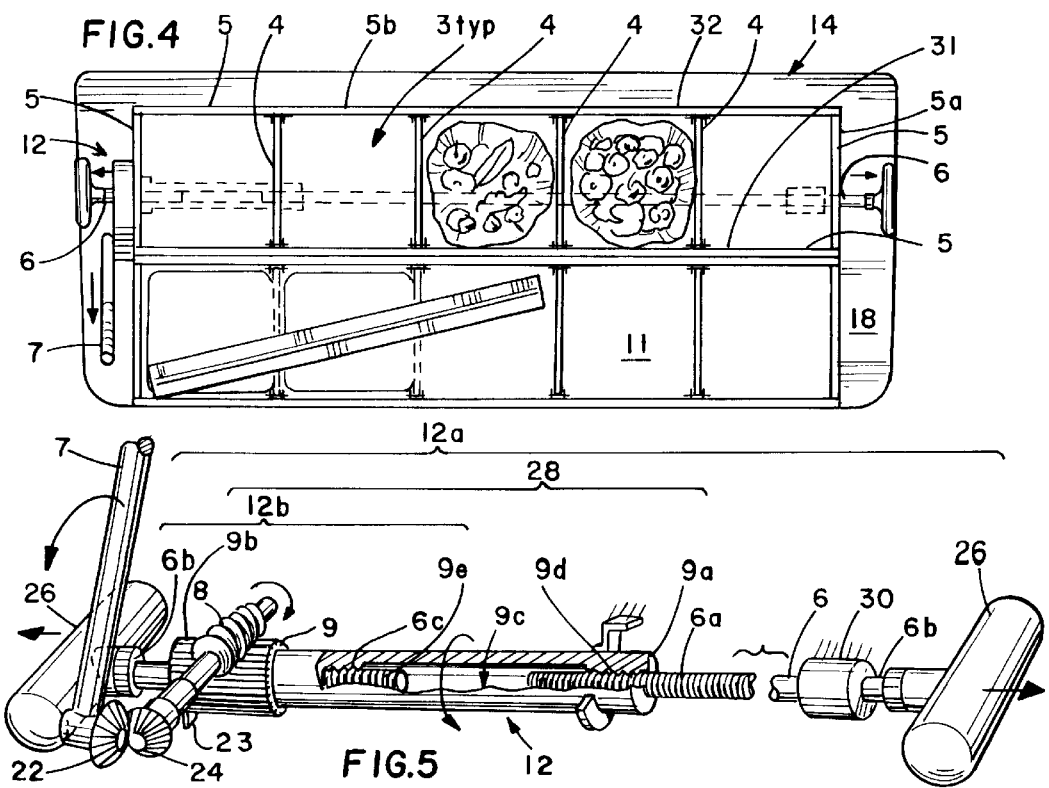

REMOVABLE VEHICLE TRUNK ORGANIZER

BACKGROUND OF THE INVENTION

This invention relates to a removable vehicle trunk organizer comprising a container with a variable number of separated compartments and a reversible locking device for laterally securing the container within a vehicle trunk. The reversible locking device comprises a spiral throw-out lock with at least one extensible leg linked to an exterior actuator. The container with predetermined dimensions has four interconnected upstanding walls, and a bottom wall having an exterior surface. Each upstanding wall has a bottom edge connected to a peripheral edge of the bottom wall.

The removable vehicle trunk organizer is particularly useful for transporting grocery bags which tend to shift while being transported in the trunk or other space of a motorized vehicle. Typically, the contents of a grocery bag will spill out and have to be reassembled in the bag at the terminal location.

Handles may be provided directly into the side of the end wall to facilitate maneuvering the container into and out of the trunk, and to a location desired by the user.

Prior art devices include portable shopping bag racks as in U.S. Pat. No. 4,189,056, which secure the contents for side to side movement, and particularly lacks the capacity to provide secure transport against forward vehicle acceleration which could cause the packages therein to become dislodged and the contents strewn about the trunk space.

To alleviate this problem, and others which will become apparent from the disclosure which follows, the present invention conveniently combines a container of predetermined dimensions having four interconnected upstanding walls, and a bottom wall having an exterior surface, and a reversible locking device for laterally securing the container within a vehicle trunk. The reversible locking device for securing the container within the vehicle trunk comprises a spiral throw-out lock with at least one extensible leg, linked to an actuator arm that is disposed on an exterior surface of one of the walls, to engage the side walls of the trunk.

Unlike U.S. Pat. No. 5,368,210 there is no need for a permanent attachment means to the vehicle itself to stabilize the storage apparatus.

The container further comprises at least one interior divider that is pivotally connected to a bottom portion of the container and is movable between an upright dividing position and a felled position adjacent to the bottom wall. Each interior divider is held in the upright dividing position by at least one fastener disposed proximate an upper edge of one of the upstanding walls. The adaptability of such dividers allows a variety of objects of varying shapes to be stored and/or transported in the removable vehicle trunk organizer of this invention. The moveable dividers allow for ready accommodation for objects greater in size than a single compartment. FIG. 4 illustrates the use of a space within the container accommodating an elongated object requiring three compartments.

An advantage of the instant device is that it can have fixed dimensions which allow for easily handling by the user, and yet still be secured against lateral movement within the trunk space.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Still other advantages will be apparent from the disclosure that follows.

SUMMARY OF THE INVENTION

The invention relates to a removable vehicle trunk organizer comprising a container of predetermined dimensions having four interconnected upstanding walls, and a bottom wall having an exterior surface, and a reversible locking device for laterally securing the container within a vehicle trunk. Each upstanding wall has a bottom edge connected to a peripheral edge of the bottom wall.

The present invention discloses the reversible locking device for securing the container within the vehicle trunk comprising a spiral throw-out lock with at least one extensible leg linked to an actuator arm that is disposed on an exterior surface of one of the walls.

A preferred embodiment of the reversible locking device for securing the container within the vehicle trunk comprises a bi-lateral spiral throw-out lock with two extensible legs linked to an actuator arm that is disposed on an exterior surface of one of the upstanding walls.

The container further comprises at least one interior divider, that is pivotally connected to a bottom portion of the container, which is movable between an upright dividing position and a felled position adjacent to the bottom wall.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Preferred embodiments of the invention are described hereinafter with reference to the accompanying drawing wherein:

FIG. 3 is a partially cut away perspective view of a five compartment removable vehicle trunk organizer of the instant invention with a second receptacle disposed adjacent to the container;

FIG. 4 is a top plan view of the container and second receptacle of the removable vehicle trunk organizer of the instant invention with two of the dividers of the second receptacle in a felled position to accommodate an elongated object;

FIG. 5 is a fragmentary perspective schematic view of the reversible locking device of the removable vehicle trunk organizer of the instant invention showing the actuator arm interconnected with motive gears and means for coaxially providing a bilateral spiral throw-out lock with two extendable legs; and FIG. 6 is a fragmentary perspective schematic view of means for connecting the container to a second receptacle with a hook disposed on one upstanding wall and a latch disposed on an adjacent upstanding wall of the adjacent object of the removable vehicle trunk organizer of the instant invention.

DETAILED DESCRIPTION OF THE INVENTION

Figure 1:
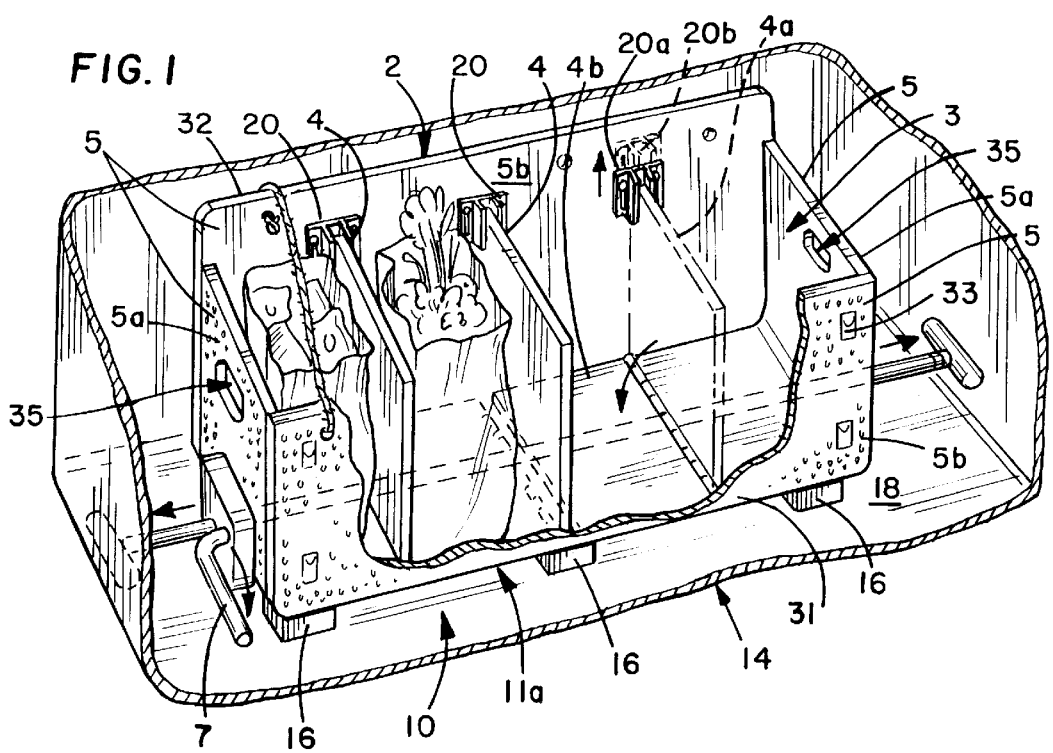
FIG. 1 is a partially cut away perspective view of the removable vehicle trunk organizer of the instant invention showing the actuator arm in the second position and two extendable legs extended distally away from the container with each shoe contacting a respective sidewall of the vehicle trunk to secure the container against lateral movement therein.

The preferred embodiments depicted in the drawing include preferred embodiments of the removable vehicle trunk organizer 10 of this invention comprising a container 2 of predetermined dimensions having four interconnected upstanding walls 5, and a bottom wall 11 having an exterior surface, and a reversible locking device 12 for laterally securing the container within a vehicle trunk 14.

Without departing from the generality of the invention disclosed herein, the container 2 may have a variable number of compartments 3 to accommodate groceries and the like and could be further defined by a variety of manually actuated extenders for securing the container 2 against lateral movement within the trunk 3.

The discussion that follows, without limiting the scope of the invention, will refer to the invention as depicted in the drawing, showing an apparatus that will accommodate four or five bags of groceries, or a lesser number of larger objects.

Figure 2:
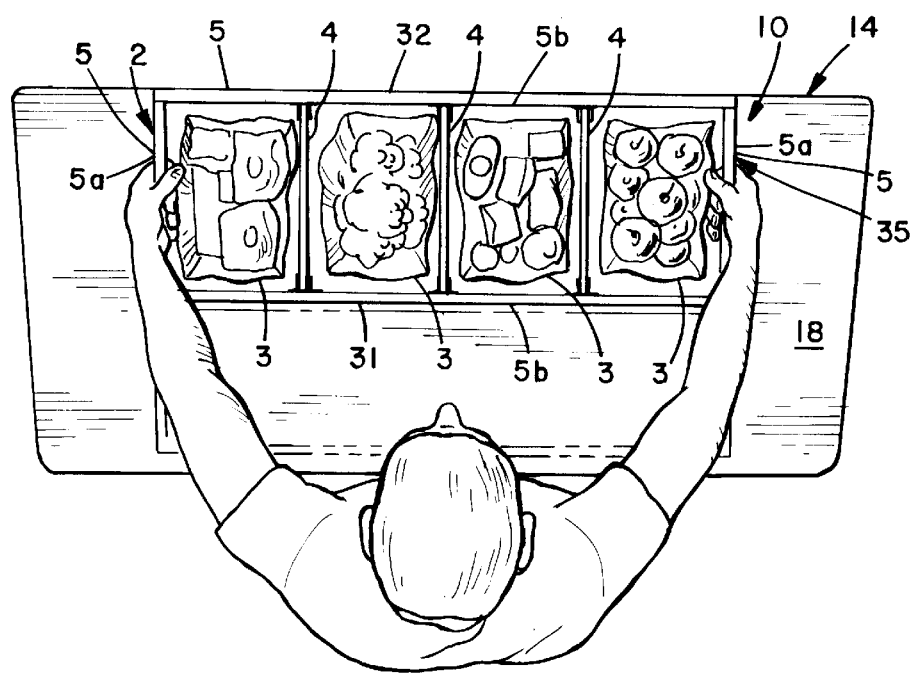
FIG. 2 is a top plan view of the removable vehicle trunk organizer of the instant invention showing a user engaging the handles disposed on the end walls.

As best shown in FIGS. 1 and 2 of the drawing, the present invention provides a container of predetermined dimensions having four interconnected upstanding walls 5, and a bottom wall 11 having an exterior surface 11a is provided. The exterior surface of the bottom wall has a plurality of footings 16 adapted to deter sliding of the container 2 on a floor 18 of the trunk 14. Each upstanding wall has a bottom edge connected to a peripheral edge of the bottom wall.

The container further comprises at least one interior divider 4 that is pivotally connected to a bottom portion of the container 2 and the at least one interior divider is movable between an upright dividing position 4a and a felled position 4b adjacent to the bottom wall 11, as best shown in FIG. 1. The at least one interior divider 4 is held in the upright dividing position 4a by at least one fastener 20 disposed proximate an upper edge of one of the upstanding walls 5.

A reversible locking device 12 for laterally securing the container 2 within a vehicle trunk 14 comprising a bi-lateral spiral throw-out lock 12a with two extensible legs 6 linked to an actuator arm 7 that is disposed on an exterior surface of one of the upstanding walls 5 is further provided with the two extensible legs 6 being coaxial.

A linkage links the two extensible leg 6 to the actuator arm 7. The linkage comprises a first bevel gear 22 extending from the actuator arm 7 operatively connected to a second bevel gear 24 disposed on an end of a rod 23 with a worm gear 8 disposed concentrically with the rod 23. The two extensible legs 6 comprise a first threaded rod 6a with a shoe 26 disposed on a leading end 6b, a second threaded rod 6c with a shoe 26 disposed on a leading end 6d, and a pinion gear 9 cooperatively engaged with the worm gear 8.

The pinion gear 9 has a first end 9a and a second end 9b, and an internal recess 9c defined therein with at least a portion of the internal recess proximate to the first end and at least a portion of the internal recess proximate to the second end being internally threaded. The direction of the internally threaded portion proximate to the first end 9a is in an opposite direction as the internally threaded portion proximate to the second end 9b.

The first threaded rod 6a has an external threaded portion that is engagingly compatible with the direction of the internally threaded portion proximate to the first end 9a. The second threaded rod 6c has an external threaded portion that is engagingly compatible with the direction of the internally threaded portion proximate to the second end 9b. The pinion gear 9 thereby acts as a motive turnbuckle to simultaneously extend the first threaded rod 6a and the second threaded rod 6c outwardly to engage the side walls of the trunk 14 when the pinion gear 9 is rotated by the worm gear 8, as the actuator arm 7 is moved from the first position to the second position, and to retract the first threaded rod 6a and the second threaded rod 6b inwardly to disengage from the side walls of the trunk 14 when the pinion gear 9 is rotated by the worm gear 8 as the actuator arm 7 is moved from the second position to the first position. The threaded rods (6a, 6c) may be connected to the container 2 through the internally threaded pinion gear 9.

The variants of preferred embodiments of the invention relate primarily to the structure of the reversible locking device 12 and the number of compartments 3 within the container 2.

In the preferred embodiments, depicted in the drawings, each of the four interconnected upstanding walls 5 has a bottom edge connected to a peripheral edge of the bottom wall 11 and is air permeable. Moreover, the bottom wall may be air permeable as well. Air permeability may be achieved by having at least one of the walls being webbed.

In another preferred embodiment of the present invention, the container 2 may have an open top.

In one embodiment of the present invention, the reversible locking device 12 for securing the container within the vehicle trunk comprises a spiral throughout lock with at least one extensible leg 6 linked to an actuator arm 7 that is disposed on an exterior surface of one of the walls.

A preferred embodiment of the reversible locking device for securing the container within the vehicle trunk comprises a bi-lateral spiral throw-out lock 12a with two extensible legs 6 linked to an actuator arm 7 that is disposed on an exterior surface of one of the upstanding walls 5.

Referring to FIG. 5, the extensible legs 6 are coaxial and the actuator arm 7 is pivotally mounted. The exterior surface on which the actuator arm is mounted is adjacent the wall that is proximate to the at least one extensible leg.

The container itself can be made out of light weight metal, but preferably is made out of durable rigid plastic to reduce the possibility of deterioration including rust. Moreover, the reversible locking device of the instant invention may be made of a rust proof alloy for strength, longevity and precision engagement. Suitable rigid plastics may likewise be available for such use.

While the removable vehicle trunk organizer can be made of varying lengths to accommodate various trunk sizes, the drawing shows two embodiments—one with four possible compartments along its length and the other with five, the container is elongated and the four upstanding side walls comprise two opposing end walls 5a and two opposing lateral walls 5b, with the actuator arm 7 mounted adjacent to one of the end walls 5a and the at least one extensible leg 6 extends in a direction transverse to one of the end walls 5a, as shown in FIGS. 1, 3, and 4. In a preferred embodiment of the present invention, the at least one extensible leg 6 extends in a direction perpendicular to one of the end walls 5a.

In a preferred embodiment of the present invention of the removable vehicle trunk organizer 10, a linkage 12b links the at least one extensible leg 6 to the actuator arm 7. The linkage includes a first bevel gear 22 extending from the actuator arm 7 operatively connected to a second bevel gear 24 disposed on an end of a rod 23 with a worm gear 8 disposed concentrically with the rod 23. The at least one extensible leg comprises a threaded rod 6c with a shoe 26 disposed on a leading end 9b and a pinion gear 9. The pinion gear is disposed concentrically with the threaded rod and is cooperatively engaged with the worm gear.

The actuator arm is movable between a first position 7b in which the shoe of the extensible leg is retracted and a second position 7a in which the shoe is extended distally away from the container. In this way, the shoe may contact a side wall of the vehicle trunk to secure the container against lateral movement therein.

Pivotable movement of the actuator arm rotates the first bevel gear 22 of the actuator arm 7 effecting a rotation of the rod 23 and worm gear 8 through the second bevel gear 24 and the threaded rod 6c will axially move through engagement of the threads of the threaded rod with the internal threads of the sleeve 30 with the worm gear thereby connected to the actuator arm 7. The worm gear 8 is in operative engagement with pinion gear 9. The pinion gear 9 is disposed on a first end 9b of an elongated element 28; said elongated element may have internal threaded portions with a contact surface extending from a second end 9a thereof; and the spiral throw-out lock is moveable between a first position in which contact surface of said elongated element is disposed substantially within the predetermined dimensions of the container measured horizontally and a second position in which the contact surface of each said elongated element extends beyond the predetermined dimensions of the container measured horizontally. The contact surface of each said elongated element may thereby engage an upstanding side wall of the vehicle trunk to lock the container from shifting within the vehicle trunk.

Preferably, the threaded rod 6a can be connected to the container by an internally threaded sleeve 30 fixedly attached to the container and disposed concentrically with the threaded rod, as shown in FIG. 5. The threaded rod 6a may also be connected to the container 2 through the connection to a pinion gear 9 that is axially restrained.

Preferably, the pinion gear 9 has an internal recess defined therein with at least a portion thereof being internally threaded, and the threaded rod 6c is connected to the container 2 through the internally threaded pinion gear 9 and is movable axially in response to the rotational movement of the pinion gear.

In another preferred embodiment of the removable vehicle trunk organizer of the present invention, a linkage links the two extensible leg 6 to the actuator arm 7, with the linkage comprising a first bevel gear 22 extending from the actuator arm operatively connected to a second bevel gear 24 disposed on an end of a rod 23 with a worm gear 8 disposed concentrically with the rod 23. The two extensible legs comprise a first threaded rod 6a with a shoe 26 disposed on a leading end 6b, a second threaded rod 6c with a shoe 26 disposed on a leading end 6d, and a pinion gear cooperatively engaged with the worm gear. The pinion gear has a first end 9a and a second end 9b and an internal recess defined therein with at least a portion of the internal recess proximate to the first end 9a and at least a portion of the internal recess proximate to the second end 9b being internally threaded, and the direction of the internally threaded portion proximate to the first end being in an opposite direction as the internally threaded portion proximate to the second end.

The first threaded rod 6a has an external threaded portion that is engagingly compatible with the direction of the internally threaded portion 9d proximate to the first end, and the second threaded rod 6c has an external threaded portion 9e that is engagingly compatible with the direction of the internally threaded portion proximate to the second end. The pinion gear thereby acts as a motive turnbuckle, as best shown in FIG. 5, to extend the first threaded rod 6a and the second threaded rod 6c outwardly to engage the side walls of the trunk when the pinion gear is rotated by the worm gear as the actuator arm is moved from the first position to the second position, to retract the first rod and the second rod inwardly to disengage from the side walls of the trunk when the pinion gear is rotated by the worm gear as the actuator arm is moved from the second position to the first position, and the threaded rods is connected to the container through the internally threaded pinion gear.

Additionally, each of the extensible legs 6 may be disposed under the bottom wall of the container, when the actuator arm is in the first position.

In a preferred embodiment of the present invention, the exterior surface of the bottom wall has a plurality of footings 16 adapted to deter sliding of the container on a floor of the trunk. Furthermore, the container may have a variable number of compartments 3.

Preferably, the container will comprise at least one interior divider 4. While the at least one interior divider may be removable, preferably it is pivotally connected to a bottom portion of the container and the at least one interior divider may be movable between an upright dividing position and a felled position adjacent to the bottom wall. The at least one interior divider may be held in the upright dividing position by at least one fastener disposed proximate an upper edge of one of the upstanding walls. In one embodiment of the at least one fastener it is movable relative to the upper edge.

In a preferred embodiment of the removable vehicle trunk organizer of the present invention, the upstanding walls comprise two parallel side walls 5b and two parallel end walls 5a, and the bottom wall 11 is rectangular. Preferably, the two parallel side walls comprise a front wall 31 and a back wall 32, and the back wall has a greater vertical dimension than the front wall so that the container may be arranged in the vehicle trunk with the back wall being disposed proximate to the back of the vehicle trunk (away from the rear end of the vehicle) and with the front wall being disposed proximate to a loading end of the vehicle trunk.

Additionally, the front wall 31 of the container may have means for connecting the front wall of the container to another object. The another object may comprise a second receptacle having at least one upstanding peripheral wall adapted to be connected to the means for connecting, so that the at least one upstanding peripheral wall of the second receptacle may be connected to the front wall of the container. The means for connecting the front wall of the container to another object may comprise a stationary hook 33, as shown in FIG. 6, disposed on the front wall 31.

To secure the open top of the container, at least one bungy strap or like device may be employed.

The means for connecting the front wall of the container to another object may comprise at least one hook 33 disposed on the front wall that is adapted to engage an upper edge of the at least one upstanding wall of the second receptacle. A latch 34 may be disposed on an adjacent upstanding wall of the adjacent object of the removable vehicle trunk organizer of the instant invention.

In a preferred embodiment of the present invention, the bottom wall 11 and each of the upstanding walls 5 are perforated. Furthermore, each of the two parallel end walls 5a may have an aperture 35 adapted for use as a handle allowing a user to grasp the container through the aperture disposed in each of the two parallel end walls for moving the container.

Additionally, at least a top portion of the aperture for the handles may be lined with sponge rubber pad to facilitate easy handling.

In a preferred embodiment of the removable vehicle trunk organizer of the present invention, a container of predetermined dimensions having four interconnected upstanding walls 5, and a bottom wall 11 having an exterior surface 11a is provided. Each upstanding wall has a bottom edge connected to a peripheral edge of the bottom wall. The exterior surface of the bottom wall has a plurality of footings 16 adapted to deter sliding of the container on a floor of the trunk 14.

The container further has at least one interior divider 4 that is pivotally connected to a bottom portion of the container 2 and the at least one interior divider being is movable between an upright dividing position and a felled position adjacent to the bottom wall 11. The at least one interior divider is held in the upright dividing position by at least one fastener 20 disposed proximate an upper edge of one of the upstanding walls. Said fastener may be moveable in and out of position for engagement to the divider.

A reversible locking device 12 for laterally securing the container 2 within a vehicle trunk 14 comprising a spiral throw-out lock with at least one extensible leg 6 linked to an actuator arm 7 that is disposed on an exterior surface of one of the walls is also provided. The actuator arm is pivotally mounted. The exterior surface on which the actuator arm is mounted adjacent the wall that is proximate to the at least one extensible leg.

Furthermore, a linkage links the at least one extensible leg to the actuator arm. The linkage comprises a first bevel gear 22 extending from the actuator arm 7 operatively connected to a second bevel gear 24 disposed on an end of a rod 23 with a worm gear 8 disposed concentrically with the rod 23. The at least one extensible leg 6 comprises a threaded rod with a shoe 26 disposed on a leading end and a pinion gear 9. The threaded rod is connected to the container by an internally threaded sleeve 30 fixedly attached to the container and disposed concentrically with the threaded rod. The pinion gear is disposed concentrically with the threaded rod and is cooperatively engaged with the worm gear.

The actuator arm 7 moves between a first position in which the shoe 26 of the extensible leg 6 is retracted and a second position in which the shoe is extended distally away from the container, so that the shoe may contact a side wall of the vehicle trunk to secure the container against lateral movement therein.

Preferably the dimensions of the container are such that an expanded grocery bag may be positioned therein with the dimensions of the compartment of the container with the divider upstanding. Moreover, as illustrated by the drawing, the container can be sized to accommodate a predetermined number of compartments. As illustrated, in FIGS. 1 and 2, the container size can accommodate four compartments while in FIGS. 3 and 4, a container having four or five compartments. Preferably one size container can be adapted to fit a majority of cars, jeeps, and vans with the reversibly locking device suitably sized to accommodate the dimensions of each vehicle.

Preferably the second receptacle will have similar lateral dimensions of that of the initial container, but without the raised and back wall, so to facilitate the locking of the respective side walls.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims.

The invention resides not in any one of these features per se, but rather in the particular combination of all of them herein disclosed and claimed and it is distinguished from the prior art in this particular combination of all of its structures for the function specified.

Further, the purpose of the foregoing is to enable the U.S. patent and Trademark Office and the public generally, and especially the scientist, engineers and practitioners in the art who are not familiar with patent or legal terms of phraseology, to determine quickly from a cursory inspection the nature and essence of the technical disclosure of the application.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A removable vehicle trunk organizer comprising:
    a. a container of predetermined dimensions having four interconnected upstanding walls, and a bottom wall having an exterior surface, each upstanding wall having a bottom edge connected to a peripheral edge of the bottom wall; and
    b. a reversible locking device for laterally securing the container within a vehicle trunk, wherein the reversible locking device for securing the container within the vehicle trunk comprises a lock with at least one extensible leg linked to an actuator arm that is disposed on an exterior surface of one of the walls, and wherein a linkage links the at least one extensible leg to the actuator arm, said linkage comprising a first bevel gear extending from the actuator arm operatively connected to a second bevel gear disposed on an and of a rod with a worm gear disposed concentrically with said rod, said at least one extensible leg comprising a threaded rod with a shoe disposed on a leading end and a pinion gear, said pinion gear being disposed concentrically with said threaded rod and being cooperatively engaged with the worm gear, and said actuator arm moves between a first position in which the shoe of the extensible leg is retracted and a second position in which the shoe is extended distally away from the container, whereby, the shoe may contact a side wall of the vehicle trunk to secure the container against lateral movement therein.

2. The removable vehicle trunk organizer of claim 1, wherein said threaded rod is connected to the container by an internally threaded sleeve fixedly attached to the container and disposed concentrically with the threaded rod.

3. The removable vehicle trunk organizer of claim 2, wherein the pinion gear has an internal recess defined therein with at least a portion thereof being internally threaded, and said threaded rod is connected to the container through said internally threaded pinion gear and is movable axially in response to the rotational movement of said pinion gear.

4. A removable vehicle trunk organizer comprising:

a. a container of predetermined dimensions having four interconnected upstanding walls, and a bottom wall having an exterior surface, each upstanding wall having a bottom edge connected to a peripheral edge of the bottom wall; and b. a reversible locking device for laterally securing the container within a vehicle trunk, wherein the reversible locking device for securing the container within the vehicle trunk comprises a bi-lateral lock with two extensible legs linked to an actuator arm that is disposed on an exterior surface of one of the upstanding walls, wherein the extensible legs are coaxial, and wherein a linkage links the two extensible legs to the actuator arm, said linkage comprising a first bevel gear extending from the actuator arm operatively connected to a second bevel gear disposed on an end of a rod with a worm gear disposed concentrically with said rod, said two extensible legs comprise a first threaded rod with a shoe disposed on a leading end, a second threaded rod with a shoe disposed on a leading end, and a pinion gear cooperatively engaged with the worm gear, said pinion gear having a first end and a second end and an internal recess defined therein with at least a portion of the internal recess proximate to the first end and at least a portion of the internal recess proximate to the second end being internally threaded, and the direction of the internally threaded portion proximate to the first end being in an opposite direction as the internally threaded portion proximate to the second end, the first threaded rod having an external threaded portion that is engagingly compatible with the direction of the internally threaded portion proximate to the first end, and the second threaded rod having an external threaded portion that is engagingly compatible with the direction of the internally threaded portion proximate to the second end, whereby, the pinion gear acts as a motive turnbuckle to extend the first threaded rod and the second threaded rod outwardly to engage the side walls of the trunk when said pinion gear is rotated by the worm gear as the actuator arm is moved from the first position to the second position, to retract the first rod and the second rod inwardly to disengage from the side walls of the trunk when said pinion gear is rotated by the worm gear as the actuator arm is moved from the second position to the first position, and said threaded rods being connected to the container through said internally threaded pinion gear.

5. The removable vehicle trunk organizer of claim 4, wherein each said extensible leg is disposed under the bottom wall of the container, when the actuator arm is in the first position.

6. A removable vehicle trunk organizer comprising:

a. a container of predetermined dimensions having four interconnected upstanding walls, and a bottom wall having an exterior surface, each upstanding wall having a bottom edge connected to a peripheral edge of the bottom wall, said exterior surface of the bottom wall has a plurality of footings adapted to deter sliding of the container on a floor of the trunk, said container further having at least one interior divider that is pivotally connected to a bottom portion of the container and said at least one interior divider being movable between an upright dividing position and a felled position adjacent to the bottom wall, and wherein the at least one interior divider is held in the upright dividing position by at least one fastener disposed proximate an upper edge of one of the upstanding walls; and b. a reversible locking device for laterally securing the container within a vehicle trunk comprising a lock with at least one extensible leg linked to an actuator arm that is disposed on an exterior surface of one of the walls, said actuator arm being pivotally mounted and the exterior surface on which the actuator arm is mounted adjacent the wall that is proximate to the at least one extensible leg, and wherein a linkage links the at least one extensible leg to the actuator arm, said linkage comprising a first bevel gear extending from the actuator arm operatively connected to a second bevel gear disposed on an end of a rod with a worm gear disposed concentrically with said rod, said at least one extensible leg comprising a threaded rod with a shoe disposed on a leading end and a pinion gear, said threaded rod is connected to the container by an internally threaded sleeve fixedly attached to the container and disposed concentrically with the threaded rod, said pinion gear being disposed concentrically with said threaded rod and being cooperatively engaged with the worm gear, and said actuator arm moves between a first position in which the shoe of the extensible leg is retracted and a second position in which the shoe is extended distally away from the container, whereby, the shoe may contact a side wall of the vehicle trunk to secure the container against lateral movement therein.

7. A removable vehicle trunk organizer comprising:

a. a container of predetermined dimensions having four interconnected upstanding walls, and a bottom wall having an exterior surface, said exterior surface or the bottom wall having a plurality of footings adapted to deter sliding of the container on a floor of the trunk, each upstanding wall having a bottom edge connected to a peripheral edge of the bottom wall, said container further comprises at least one interior divider that is pivotally connected to a bottom portion of the container and said at least one interior divider is movable between an upright dividing position and a felled position adjacent to the bottom wall, and wherein the at least one interior divider is held in the upright dividing position by at least one fastener disposed proximate an upper edge of one of the upstanding walls; and b. a reversible locking device for laterally securing the container within a vehicle trunk comprising a bi-lateral lock with two extensible legs linked to an actuator arm that is disposed on an exterior surface of one of the upstanding walls, said two extensible legs being coaxial, and wherein a linkage links the two extensible legs to the actuator arm, said linkage comprising a first bevel gear extending from the actuator arm operatively connected to a second bevel gear disposed on an end of a rod with a worm gear disposed corcentrically with said rod, said two extensible legs comprise a first threaded rod with a shoe disposed on a leading end, a second threaded rod with a shoe disposed on a leading end, and a pinion gear cooperatively engaged with the worm gear, said pinion gear having a first end and a second end and an internal recess defined therein with at least a portion of the internal recess proximate to the first end and at least a portion of the internal recess proximate to the second end being internally threaded, and the direction of the internally threaded portion proximate to the first end being in an opposite direction as the internally threaded portion proximate to the second end, the first threaded rod having an external threaded portion that is engagingly compatible with the direction of the internally threaded portion proximate to the first end, and the second threaded rod having an external threaded portion that is engagingly compatible with the direction of the internally threaded portion proximate to the second end, whereby, the pinion gear acts as a motive turnbuckle to extend the first threaded rod and the second threaded rod outwardly to engage the side walls of the trunk when said pinion gear is rotated by the worm gear as the actuator arm is moved from the first position to the second position, to retract the first rod and the second rod inwardly to disengage from the side walls of the trunk when said pinion gear is rotated by the worm gear as the actuator arm is moved from the second position to the first position, and said threaded rods being connected to the container through said internally threaded pinion gear.

* * * * *